United States Patent [19]

Boisset et al.

[11] Patent Number: 4,743,066
[45] Date of Patent: May 10, 1988

[54] TILTABLE SEATS FOR VEHICLES

[75] Inventors: Bernard Boisset, Etampes; Alain Letournoux, St. Jean De Blanc, both of France

[73] Assignee: Societe Industrielle Bertrand Faure, Etampes, France

[21] Appl. No.: 937,156

[22] Filed: Dec. 2, 1986

[30] Foreign Application Priority Data

Dec. 18, 1985 [FR] France .................................. 85 18777

[51] Int. Cl.⁴ ............................................. A47C 1/022
[52] U.S. Cl. ..................................... 297/339; 248/442; 297/341; 297/379
[58] Field of Search ............... 297/337, 338, 339, 379, 297/341, 330; 248/419, 157, 422

[56] References Cited

U.S. PATENT DOCUMENTS

| 257,065 | 4/1882 | Pursell | 297/338 X |
|---|---|---|---|
| 2,132,009 | 10/1938 | Ball | 248/422 X |
| 2,826,241 | 3/1958 | Himka | 297/341 |
| 3,049,329 | 8/1962 | Eddy | 248/419 X |
| 3,568,972 | 3/1971 | Sherman | 248/419 |
| 3,873,152 | 3/1975 | Garas | 297/330 X |
| 4,225,177 | 9/1980 | Kluting | 297/379 X |
| 4,269,446 | 5/1981 | Gersmann et al. | 297/341 |
| 4,312,537 | 1/1982 | Lindenberg | 297/341 X |
| 4,387,874 | 6/1983 | Boisset | 297/339 X |
| 4,568,053 | 2/1986 | Strowik et al. | 297/330 X |

FOREIGN PATENT DOCUMENTS

| 57617 | 8/1982 | European Pat. Off. | 297/330 |
|---|---|---|---|
| 2006816 | 9/1971 | Fed. Rep. of Germany | 297/337 |
| 1448282 | 6/1966 | France | 297/338 |
| 696286 | 10/1965 | Italy | 297/379 |
| 124132 | 2/1949 | Sweden | 297/337 |
| A2140293 | 11/1984 | United Kingdom | 297/339 |

Primary Examiner—Kenneth J. Dorner
Assistant Examiner—Thomas A. Rendos
Attorney, Agent, or Firm—Townsend and Townsend

[57] ABSTRACT

A tiltable and height- adjustable seat for a vehicle with three doors, said seat comprising two front racks, two rear racks, two front pinions cooperating with the front racks, two rear pinions cooperating with the rear racks, two cross-rods respectively fastening the two front pinions and the two rear pinions and supporting the sitting portion and an actuating knob connected angularly to one at least of the pairs of pinions. The tilting axle of the seat is rigidly connected to the base and to the backrest, the front racks are mounted pivotably around an axle joined rigidly to the base, the rear axles are fast to the backrest and the axle of the two front pinions is joined to the axle of the two rear pinions by a rigid cross-piece.

1 Claim, 2 Drawing Sheets

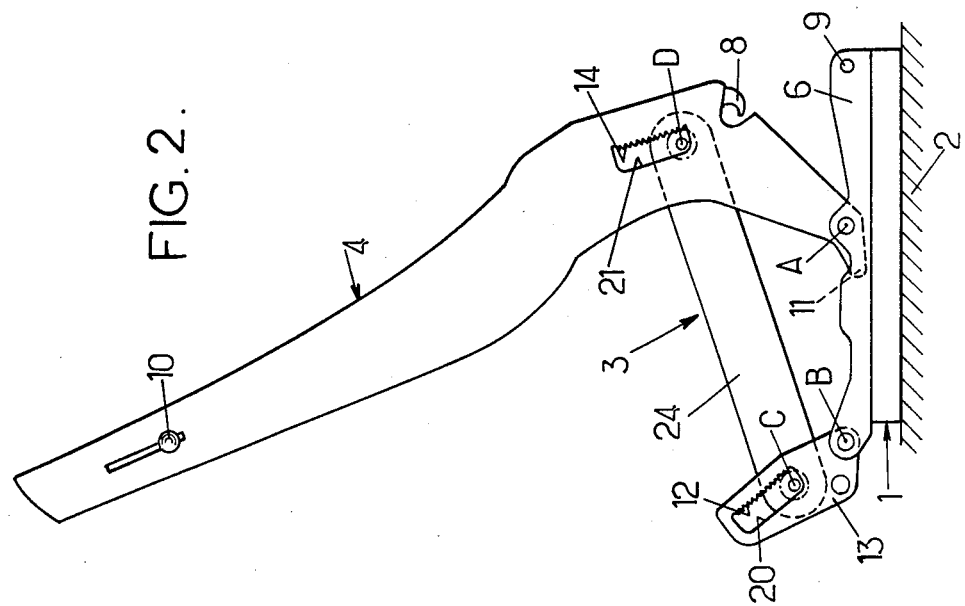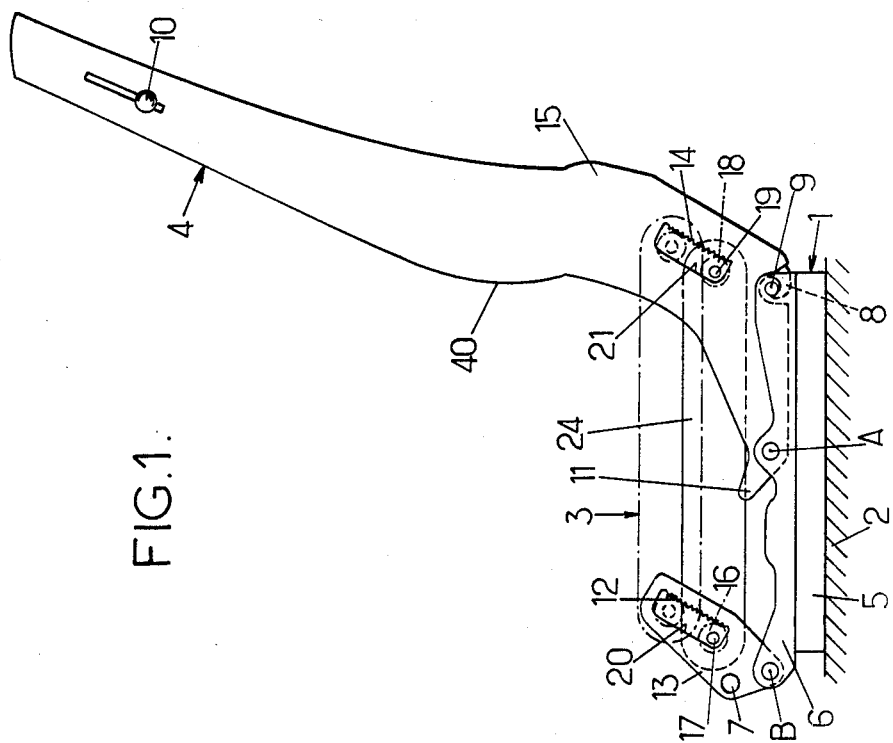

TILTABLE SEATS FOR VEHICLES

BACKGROUND OF THE INVENTION

The present invention relates to vehicle seats adapted to be tilted or tipped forwards from their normal driving position in order particularly to liberate access to the rear places if the vehicle is of the so-called "three door" type.

It is directed more particularly, among these seats, to those which comprise a base which can be fastened to the floor of the vehicle, a sitting portion resting on the base through a height-adjustment device and a back rest portion, said seat being mounted to pivot around a transverse axle connected rigidly to the base so as to be tiltable forwards in pulling the rear of the sitting portion.

It relates more particularly also to the case where the height-adjustment device comprises a pair of transversely spaced parallel front racks, a pair of transversely spaced parallel rear racks, two coaxial front pinions with transverse axle fastened to one another by a rigid front cross-piece mounted on the sitting portion and adapted to cooperate with the front racks, two coaxial rear pinions of transverse axle fastened to one another by a rigid rear cross-piece mounted on the sitting portion adapted to cooperate with the rear racks and at least one actuating member accessible to the user of the seat when he is sitting on said seat and adapted to actuate the rotation of at least one of the two pairs of pinions.

In known embodiments of these seats, the backrest is mounted to pivot on the sitting portion itself which certainly presents the advantage of avoiding any influence of the tilting of the seat on the height-adjustment device, but has also certain drawbacks and in particular the following:
- the anchorage of the backrest to the floor of the vehicle passes through the height adjustment mechanism:
  - this connection is generally insufficiently robust to respond to the relative requirements for the anchoring of the seats and backrests to the floor of the vehicle, in view of the risk of tearing away the latter on sudden deceleration,
- the height adjustment relates to the seat as a whole, which does not permit lumbar adjustment to be made through relative vertical movement of the sitting portion with respect to the backrest.

It is an object of the invention to enable these various drawbacks to be overcome.

GENERAL DESCRIPTION OF THE INVENTION

With this object, according to the invention the axle common to the two front pinions of the height adjustment device is connected to the axle common to the two rear pinions through a rigid cross-piece, the front racks are mounted to pivot around a transverse axle joined rigidly to the base of the seat, the rear racks are fastened to the backrest and the tilting axle of the seat is connected rigidly to the backrest.

In preferred embodiments, recourse is had in addition to one and/or to other of the following features:
- the front racks are parallel with the rear racks when the backrest is in its normal driving position,
- when the backrest is in its normal driving position, the racks are inclined to the vertical, their top ends being behind with respect to their bottom ends: this measure enables the longitudinal extent of the bearing surface on the sitting portion to be increased automatically during adjustment of the latter downwards, and conversely,
- the seat comprises means for angularly fastening the front pinions and the rear pinions: this measure enables the height adjustment of the sitting portion to be ensured by means of a single actuating member,
- in a seat according to the preceding paragraph, the angular fastening means comprise two toothed wheels fast respectively to the front pinions and the rear pinions and an endless chain or the like cooperating with these two wheels,
- the actuating member of the height adjustment of the seat is a rotary knob associated with automatic locking means for this knob in the resting position,
- the control member of the height adjustment device of the sitting portion is the energizing switch of an electric motor,
- the seat comprises a reducing gear train inserted between the actuating member and the pinions actuated by this member, so that the rotation by one turn of the member only corresponds to the rotation of a fraction of a turn of the pinions,
- the seat comprises at least one helical tension spring of which one end is fixed to the rigid cross piece connecting the axle of the front pinions and the axle of the rear pinions, and of which the other end is fixed to a band wound on a drum fast to one of said pinions, so that this pinion is urged angularly in the direction of the erection of the sitting portion.

The invention will be better understood on reading the description which follows of a particular embodiment, given by way of non-limiting example.

BRIEF DESCRIPTION OF THE DRAWINGS

The invention refers to the accompanying drawings in which:

FIG. 1 shows diagrammatically a seat constructed according to the invention in its normal driving position, two different heights being indicated for the sitting portion, respectively in full line and in mixed line, FIG. 2 shows diagrammatically the same seat in its forward-tilted position.

DESCRIPTION OF A PREFERRED EMBODIMENT

Figure 3:
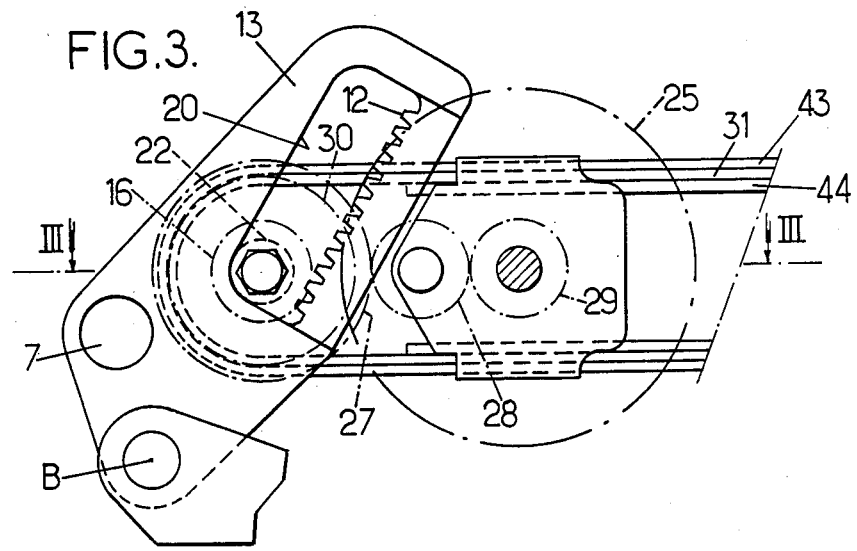
FIG. 3 is a partial sideview of the height-regulating device of the sitting portion.

The seat concerned comprises a base 1 which can be made fast to the floor 2 of the vehicle, a sitting portion 3 and a backrest 4.

The base 1 comprises:
- two slideways 5 extending longitudinally, that is to say in the front-rear direction of the vehicle, and enabling adjustment in longitudinal position of the seat.
- and two bases 6 mounted on the slideways 5, said bases being constituted by vertical metal webs extending longitudinally.

The backrest 4 comprises an inverted U-frame of which the lower ends of the two arms are bent forwards and are mounted to pivot on the bases 6 around the same transverse axle A connected to these bases and situated almost at the middle of their longitudinal span.

At the level of the bend of at least one of these arms, the backrest 4 comprises a hook 8 urged elastically towards a resting position and adapted to coact with a pin 9 of one base for the purpose of fixing the backrest in its rear position, which is the normal driving position.

This hook 8 is actuatable in manner known in itself from a handle 10 provided in the top part of the backrest.

The ends of the bent arms of the frame are terminated by two beaks 11 extending forwards. The they stop against the bottoms of the bases 6 or against the slideways 5 supportig these frames constitutes angular end-of-travel stops for the tilting of the backrest forwards.

The height-regulating device of the sitting portion 3 comprises:

two parallel front racks 12 borne respectively by two parallel links 13 situated on the two sides of the seat, these links being themselves mounted to pivot around a front transverse axle B connected to the bases 6 and being cross-braced by a transverse bar 7, two parallel rear racks 14 borne respectively by the bases of the two arms of the backrest 4, the bases themselves being constituted by flanges 15, two front pinions 16 fastened to one another by a cross-rod 17 and adapted to cooperate with the two front racks 12, and two rear pinions 13 fastened to one another by a cross-rod 19 and adapted to cooperate with the two rear racks 14.

Figure 4:
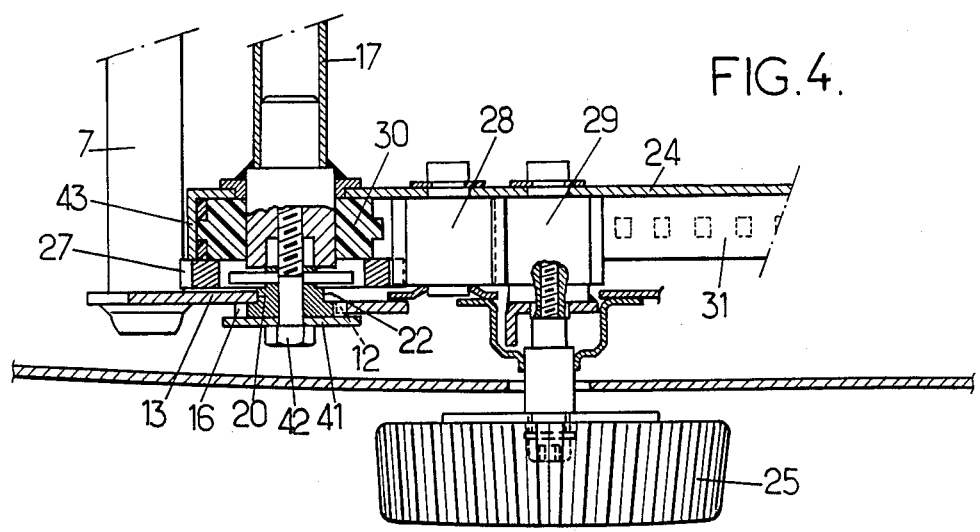
FIG. 4 is a sectional view along the line III—III of FIG. 3.

So that the cooperation indicated between the pinions and the racks may be permanently ensured, said pinions are housed in elongated and narrow apertures 20 and 21 cut out respectively in the links 13 and in the flanges 15. The elongated edges of these apertures are rectilinear and parallel, one being smooth and the other toothed so as to constitute one of the racks 12 and 14. Each pinion is then made fast to a cylindrical ring of revolution 22 (FIG. 4) adapted to roll or slide without play against the smooth edge of the aperture 20 or 21 concerned, this edge being slightly offset, in a transverse direction, with respect to the associated rack, to permit the two smooth and toothed contacts concerned (see FIG. 4). Finally the axial positioning of each pinion-ring assembly in its aperture is determined by axial imprisonment of the pinion between on the one hand an overlapping washer 41 screwed at the end by a screw 42 to the corresponding cross-rod 17 or 19 and on the other hand the flank, of the link, or corresponding flange, adjacent to the smooth edge of the aperture concerned.

Two parallel rigid cross-pieces 24 extend between the two cross-rods 17 and 19 so as to form with them an undeformable rectangular frame, said cross-rods 17 and 19 being pivotably mounted on said cross-pieces 24.

It is on this frame that the sitting portion is mounted itself constituted in any desirable manner, particularly by a bucket seat covered by a cushion.

A rotary control knob 25 accessible to the person sitting on the seat is joined to the front pinions 16 by a set of three gears 27, 28 and 29 the first of which 27 is angularly fast to the pinions 16 and the third of which 29 is angularly fast to the knob 25.

The ratio of this train is such that the rotation by one turn of the knob 25 corresponds to only a fraction of a turn of the pinions 16.

This arrangement enables the risk of reversibility of the actuation ensured by the rotation of the knob, to be reduced.

In a preferred but not indispensable arrangement, the two pairs of pinions are made angularly fast to one another by a mechanism comprising on the one hand two toothed wheels 30 or the like fast respectively to these two pairs of pinions and, on the other hand, a toothed endless chain 31 adapted to coact with the two wheels 30, said chain, for example, being constituted by a thin perforated band sliding in edgewise relationship between two protective leaves 43 and 44.

This measure enables the height of the seat to be adjusted by single maneuvers.

It assumes that, when the backrest 4 is in its normal driving position, the different racks 12 and 14 are all parallel with one another.

Under these conditions, the movements of the knob are manifested by changes in the height of the sitting portion alone, that is to say independently of the backrest 4, and this without any change in the orientation of the said sitting portion.

In another preferred embodiment of the invention, for the normal driving position, the racks are inclined to the vertical with their top points behind their lowest points.

The direction chosen for the obliquity of these racks enables the longitudinal dimension of the bearing surface of the sitting portion to be automatically lengthened when the latter is lowered, which permits automatic adaptation of the seat to the morphology of the users, by improving the support of the front thighs of users with long legs (low position) without however preventing user with short legs from being seated fully into the seat and hence of being fully supported against the backrest (upper position).

To render possible the vertical movements indicated above of the sitting portion with respect to the backrest, there is provided in the rear portion of the seat padding a space which can be squeezed on contact with the padding of the backrest.

To render the actuation of the knob 25 as easy in the direction of raising the seat as in the direction of lowering it, there is advantageously provided means for compensating the average weight of a user.

Figure 5:
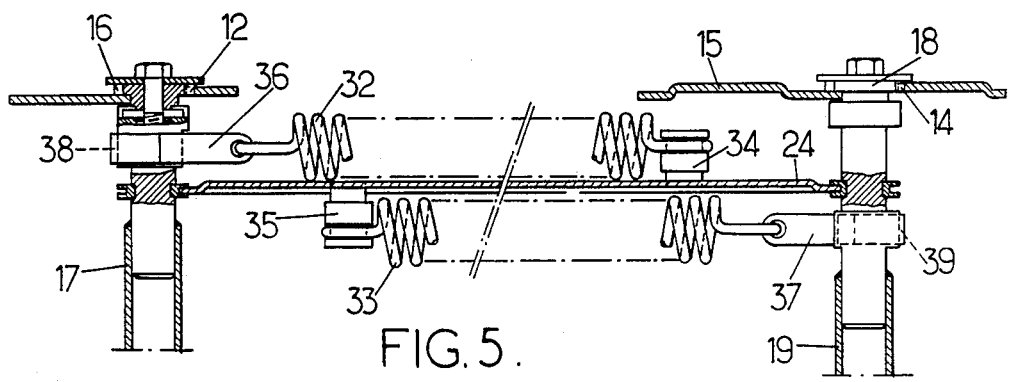
FIG. 5 is a plan view of a compensating system for the weight of the user of the seat according to an advantageous embodiment of the invention.

In the embodiment shown by way of example in FIG. 5, these means comprise two helical tension springs 32, 33, each stretched respectively between a pin 34, 35 fast to one of the cross-pieces 24 and a band 36, 37 partly wound around a drum 38, 39 angularly fast, the first to the pinions 16, and the second, to the pinions 18: of course, in each case, the direction of winding of the band is such that the tension of the spring associated therewith has a tendency to rotate the pinions concerned in the direction for which they tend to climb along the racks.

The operation of the seat described above is as follows.

For the normal driving position, the backrest 4 is locked in its rear position by cooperation of the hook 8 with the pin 9 (FIG. 1).

All the racks 12 and 14 are then parallel with one another.

It then suffices to rotate the knob 25 to modify the height of the sitting portion by simultaneous rotation of the pinions along the racks with which they cooperate.

It is to be noted:

that this adjustment does not modify the inclination of the sitting portion which therefore moves parallel with itself, and that said adjustment does not affect the backrest in any way, which improves the lumbar support in all cases: in fact the bulged area 40 of the backrest which corresponds to the support of the loins of the user remains fixed during said adjustment, which amounts to automatically lowering his relative position with respect to the seat for users of small stature and conversely.

From release of the knob 25, the position adjusted in height of the sitting portion is preserved, either due to the simple fact of the reduction ratio of the control mechanism, combined with a sufficient weight compensation, or due to the fact that the knob is associated with a self-locking mechanism known in itself.

If it is then desired to lower the seat forwards, particularly in order to free access to the rear places of the vehicle if the latter is a coupe or convertible, it suffices to release the hook 8 from the pin 9 by moving the handle 10, and then to push the top of the backest forwards.

As is easily seen in FIG. 2, the tilting of the seat is then made possible, whatever the height given to the sitting portion due to the fact of the articulated mounting of all the rigid elements 6, 13, 24 and 15 around four axles A, B, C (axle of the front pins 16) and D (axle of the rear pins 18).

When after this temporary tilting, the seat is brought back into its initial position, the sitting portion is restored to its pre-adjusted height.

As a result of which, and whatever the embodiment adopted, there is finally provided a vehicle seat whose constitution and operation can be seen sufficiently from the foregoing.

This seat has numerous advantages with respect to those hitherto known, in particular in that it permits easy adjustment of the lumbar support and in that it permits the backrest to be firmly coupled to the base.

As is self-evident, and as emerges besides already from the foregoing, the invention is in no way limited to those of its types of aplication and embodiments which have been more especially envisaged; it encompasses, on the contrary, all modifications, particularly:

those where the rotation of the pinions would be actuated not manually, but by means of at least one electric motor, those where the single actuating member (knob or electric motor), of the embodiments described above, provided to actuate the rotations of the two front pinions and those of the two rear pinions would be split, that is to say replaced by two such distinct members associated respectively with these two drives, which solution enables the regulation not only of the height of the sitting portion, but also its tilt, those where the backrest 4 described above would be composed of two sections, namely a lower section comprising flanges 15 and racks 14 and forming a base, and an upper section mounted on the lower section so that its inclination may be adjusted as desired around a transverse axle, and those where the rigid cross-piece 24 would be constituted not in the form of a cross-piece proper, but by at least one element of the framework of the sitting portion, and particularly by a bucket seat.

We claim:

1. A tiltable vehicle seat for a vehicle which has a floor, said vehicle seat having a front edge and a rear edge, comprising:

a first traverse axis near said rear edge;

a second traverse axis near said front edge;

a base adapted for fixation to said floor;

a back rest portion pivotably secured to said base and adapted for pivoting about said first traverse axis for tilting movement from a vertical position to a forward tilted position;

a sitting portion positioned between said front edge and said rear edge;

height adjustment means attached to said sitting portion having:

a pair of laterally spaced parallel front racks pivotably mounted on said base and adapted for pivoting about said second traverse axis;

a front cross rod positioned between said front racks;

a pair of coaxial laterally spaced front pinions rigidly connected to each other by said front cross rod for respectively engaging said front racks;

a pair of laterally spaced parallel rear racks rigidly fixed to the back rest portion;

a pair of coaxial laterally spaced rear pinions rigidly connected to each other by a rear cross rod, for respectively engaging said rear racks; and a pair of laterally spaced rigid connection members perpendicular to said front and rear cross rods securing to each other said front and rear cross rods; and actuating means associated with said height adjustment means for rotating at least one pair of said pinions and arranged to be accessible for a user when said user is sitting on said sitting portion.

* * * * *